June 18, 1935.  A. B. TAPPEN  2,005,600
DISTRIBUTOR NOZZLE
Filed July 28, 1932

INVENTOR
Alexander Bonnell Tappen
BY his ATTORNEY
Andrew Fulton Jr.

Patented June 18, 1935

2,005,600

UNITED STATES PATENT OFFICE 2,005,600

DISTRIBUTOR NOZZLE

Alexander Bonnell Tappen, Briarcliff Manor,
N. Y., assignor to The Cooling Tower Co. Inc.,
New York, N. Y., a corporation of New York Application July 28, 1932, Serial No. 625,332

5 Claims. (Cl. 299—121)

My invention relates to improvements in distributor nozzles.

The invention is particularly adapted for the distribution of spray over a wide area under low head or pressure.

An object of my invention is to provide a spray nozzle which will give an even and complete spread of spray over a surface of large diameter under low head or low pressure; a further object of my invention is to provide means for breaking up a stream of water under low pressure and distributing the water in the form of finely divided spray over a wide area.

A further object of my invention is to provide a non-clogging spray distributing means.

I accomplish these and other objects by my invention, a preferred embodiment of which is illustrated in the accompanying drawing, in which, Figure 1 is a side elevation of my improved distributor nozzle.

Similar characters of reference refer to similar parts throughout the several views.

Figure 1:
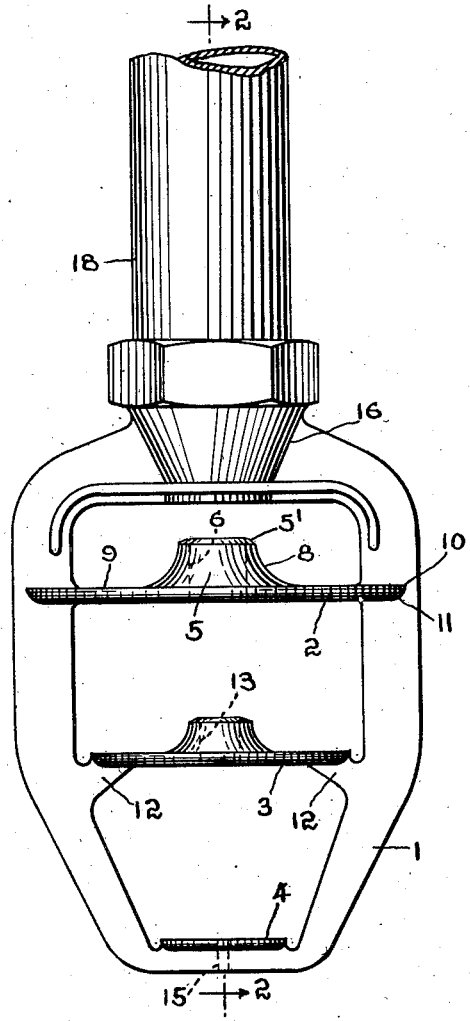
Figure 2:
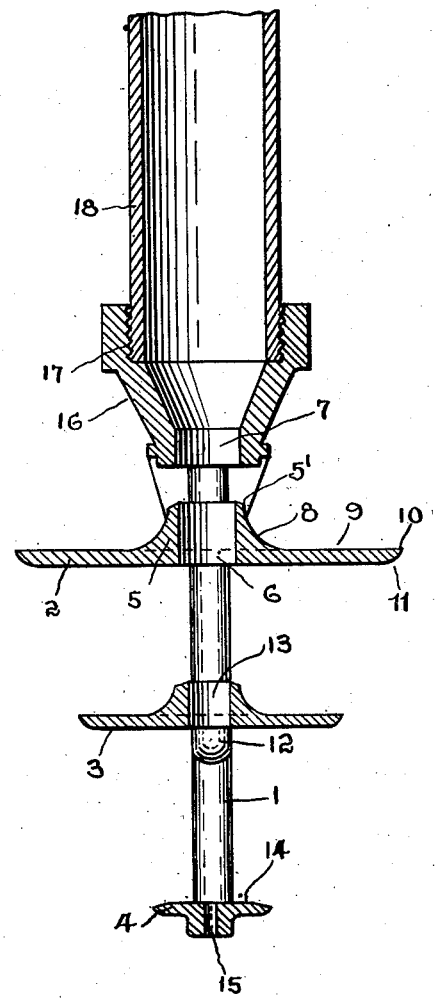
Figure 2 is a section of the same on the line 2—2 in Figure 1.
Figure 3:
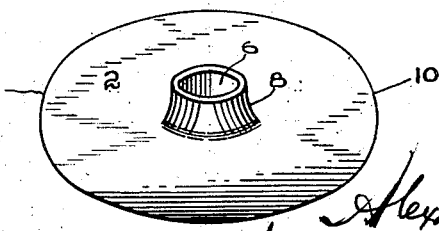
Figure 3 is a perspective view of the upper disc.

My improved device comprises a skeleton frame 1 preferably of cast bronze or other non-corrosive material having a discharge port with a plurality of axially disposed, graduated, centrally apertured horizontal discs 2, 3, 4 therebelow.

The efficiency of the device resides in the peculiar shape of these discs, to which my invention particularly relates.

The discs 2 and 3 are of like shape, the upper disc 3 being of greater size than the disc 2.

The disc 2 comprises a horizontal plate having an axial aperture 6 and an annular axially disposed raised section 5 with a flaring periphery 8 having convex sides, the upper surface 5¹ of the said raised section 5 being bevelled.

The concave sides 8 of the raised section 5 merge into the flat marginal horizontal surface 9 of the upper face of the disc 2 which has a sharp peripheral margin 10. It is important that the marginal upper surface 9 of the disc 2 be flat and horizontal and I produce the sharp edge 10 by so shaping the under side only of the peripheral margin 11 of the disc 2 as to produce the desired sharp edge.

The upper disc 2 may be cast integral with the frame 1 as shown in the drawing but it is obvious that the disc 2 may be supported in any other desired manner without departing from my invention.

The disc 3 positioned axially below and spaced from the upper disc 2 is preferably supported by integral brackets 12 on the frame 1 and is of like construction to that of the disc 2. It is, however, smaller than the disc 2 and its central aperture 13 is axially disposed with reference to the aperture 6 in the disc 2.

Below and spaced from the disc 3, I preferably provide a third disc 4 having a slightly rounded upper face 14 and which may have a small central perforation 15 axially disposed with reference to the central aperture 13 in the disc 3.

I provide in the upper part of the frame 1 a head 16 having a threaded mouth or admission port 17 adapted to receive the water supply pipe 18.

The device being thus assembled, the water to be cooled or aerated is delivered to the nozzle from the supply pipe 18 at low pressure. The orifice 6 of the disc 2 being smaller in diameter than the discharge port 7, the outer marginal portion of the entering stream will strike the bevelled edge 5¹ of raised portion 5 and the upper surface of the disc 2 and will be thrown out or splashed laterally to a considerable distance in the form of a circular sheet of finely divided spray and the sharp edge of the disc 2 will minimize the capillary attraction between the disc and water whereby little, if any, water will cling to or fall perpendicularly from the edge of the disc.

The operation above described will ensue at the disc 3 with reference to the water passing through the aperture 6 in the disc 2 and there will be produced by these two discs two evenly spaced dome shaped spray clouds one within the other.

I have discovered that comparatively slight changes and modifications in the form of the discs and particularly of their upper surfaces produce marked changes and variations of the resulting spray cloud.

It is obvious that additional discs of like construction may be employed if desired. I have, however, found in actual practice that two of these discs are sufficient in ordinary work.

The water which passes through the aperture 13 in the disc 3 will fall upon the disc 4, being the last disc of the series. In this final spray disc 4, I prefer to omit the central pyramidal raised section and to slightly round or curve the upper surface forming a convex face and to provide a small central perforation or aperture 15. The diminished column of water striking this final disc 4 will be splashed off in a still smaller spray dome in the manner above described, a small quantity passing through the central perforation 15.

It will thus be found in operation that the water delivered to the device even at a low head and pressure will be completely converted into a plurality of finely divided and separated spray clouds or domes which are thrown out laterally and cover a wide area whereby the finely divided water will be very efficiently distributed and subjected to atmospheric contact.

The non-clogging feature of my invention is also particularly important.

In the distribution of water containing foreign substance, such as sand, tar, leaves or other suspended matter, nozzles of the old type frequently clog or become obstructed and in gasoline distilling plants and the like, where there is a tarry substance carried by the water, it has been found that, in distributor nozzles of the present type, deposits accumulate on the discs to such an extent that the efficiency of the device is seriously interfered with. I have found, in practical use of my improved nozzle, that, by reason of the shape and form of the discs, there is no accumulation of foreign matter on the discs and that all foreign matter is washed off of the discs by the flowing water so that the discs are kept clean and free from accumulated deposits and the nozzle does not clog even under the most adverse conditions but operates efficiently in throwing a film of water over cooling coils and the like.

Having thus described my invention, what I claim is:

1. In a device of the character described, means for spraying water comprising a source of supply having a delivery port and a plate positioned below and spaced from said port, said plate having on its upper face a centrally apertured raised section with flaring sides, a flat horizontal annular surface surrounding said raised section and having a sharp marginal edge.

2. In a device of the character described, means for spraying water comprising a source of supply having a delivery port and a plurality of horizontal graduated spaced plates below the said delivery port each having on its upper face a centrally apertured raised section with flaring sides, a flat horizontal annular surface surrounding said raised section and having a sharp marginal edge.

3. In a device of the character described, the combination of a frame, a centrally apertured disc carried by said frame, a delivery port above said disc, a centrally located raised portion on the upper face of said disc, and a flat horizontal surface on said disc surrounding said raised portion.

4. In a device of the character described, the conbination of a frame, a delivery port therein, a plurality of centrally apertured graduated discs arranged on said frame below said port having centrally arranged apertured raised portions surrounded by a flat horizontal marginal section thereof and a small disc therebelow having a convex upper surface.

5. In a device of the character described, the combination of a frame, a delivery port therein, a centrally apertured disc below said port, having a centrally disposed raised portion, a flat horizontal marginal section, and a sharp peripheral edge, and a disc below said last named disc having a rounded upper surface.

ALEXANDER BONNELL TAPPEN.